FIG. 1

Nov. 26, 1946.     C. W. TYSON     2,411,603
CRACKING OF HYDROCARBON OILS
Original Filed July 26, 1939     3 Sheets-Sheet 3

Charles W. Tyson, Inventor
By ________ Attorney

Patented Nov. 26, 1946

2,411,603

UNITED STATES PATENT OFFICE 2,411,603

CRACKING OF HYDROCARBON OILS

Charles W. Tyson, Summit, N. J., assignor to Standard Oil Development Company, a corporation of Delaware Original application July 26, 1939, Serial No. 286,498. Divided and this application December 10, 1943, Serial No. 513,664

7 Claims. (Cl. 196—52)

This invention relates to the treatment of hydrocarbon oils and pertains more particularly to a method and apparatus adapted for conversion of hydrocarbon oils in the presence of a solid contact mass.

It has heretofore been proposed to crack hydrocarbon oils by passing such oils through a cracking zone containing a solid absorbent contact mass, such as, for example, naturally active or activated clays and certain synthetic compounds of similar absorbent nature. During the cracking process the contact mass more or less gradually becomes fouled with carbonaceous deposits which reduce the activity of the catalyst until eventually a point is reached where it becomes necessary to regenerate the catalyst to restore its activity.

According to one of the better known methods of carrying out the catalytic cracking process, the oil in vapor form preheated to the desired cracking temperature is passed through a reaction zone containing a solid mass of contact material. The rate of flow of the oil vapors is controlled to obtain a desired conversion into low boiling distillate products and the reaction products are then passed into conventional fractionating equipment for separation of the desired distillate products from the unconverted oil. In operating according to this method, the cracking operation is continued for a predetermined period until the activity of the catalyst is dropped to a point where it becomes no longer capable of effecting the desired conversion. The cracking cycle is then interrupted, the catalyst purged of residual oil and the carbonaceous deposits are burned from the catalyst by passing an oxidizing gas through the catalyst. After completing the regeneration the catalyst is again purged of regenerating gases and the reaction chamber is then subjected to another cracking cycle.

When operating in this manner it has been the practice to mold the catalyst into small cylinders, discs, pills or other shapes of uniform size to insure more uniform distribution of oil vapors and regenerating gases through the mass and reduce the resistance of the contact mass to the flow of vapors and gases therethrough.

Such method of operation has a number of disadvantages. First, in view of the necessity of frequently interrupting the cracking cycle to effect the regeneration of the catalyst it is necessary to provide a number of reaction chambers in order to operate the process continuously, so that one chamber may be undergoing the cracking cycle while others are undergoing regeneration. The original investment, therefore, necessary for providing an apparatus capable of operating at commercial capacity becomes excessively large. A further disadvantage is that it is necessary to design a reaction chamber which is capable of carrying out both the cracking operation and regenerating operation. Since the conditions for carrying out these two different operations are widely different, the design capable of most effectively carrying out the cracking cycle is not particularly adapted for effecting rapid regeneration of the catalyst mass. On the other hand, if the reaction chamber was designed primarily to effect rapid regeneration of the catalyst mass, the reaction chamber may not be particularly suitable for carrying out the cracking operation.

Attempts have also been made in a few cases to move the catalyst either in powder or granular form through the cracking zone along with the oil vapors to be cracked and then separating the catalyst from the reaction product. In accordance with this practice, the catalyst was regenerated outside the cracking zone in a separate regenerating unit, and the regenerating catalyst then recycled with the oil to be cracked.

While this method of operating overcomes a number of the difficulties and disadvantages inherent in the intermittent method of operating employing stationary masses of preformed catalyst, such attempts have not heretofore met with success for one reason or another. In some of the earlier attempts the wrong type of catalyst was used. In other cases an improper ratio of catalyst to oil vapors was employed or the oil vapors and catalyst were retained in the reaction zone either too long or not long enough to obtain the desired results.

Furthermore, the methods employed for separating the catalyst from the reaction product and for regenerating the catalyst were relatively inefficient. As a result, excessive losses of catalyst were encountered or expensive methods for recovering the catalyst from the reaction products were necessary.

The principal object of the present invention is to provide a complete and unitary process and apparatus for carrying out catalytic cracking in a continuous manner which will not be subject to the objections and difficulties of this method of operating as heretofore practiced.

A further, more detailed object of the invention is to provide a method of, and apparatus for carrying out the catalytic cracking of hydrocarbon oils in a continuous manner wherein the catalyst in powdered or granular form is injected into the oil vapors to be cracked and passed through the cracking zone along with the oil.

A further, more specific object of the invention is to provide an improved method and apparatus for more effectively and efficiently separating the catalyst from the reaction products.

A further, more detailed object of the invention is to provide an improved method of and apparatus for regenerating the catalyst particles after the activity thereof has been reduced by the formation of carbonaceous deposits thereon.

A further, more specific object of the invention is to provide a method of carrying out catalytic cracking in a continuous manner wherein the catalyst is used more efficiently.

Other more specific and detailed objects of the invention will be apparent from the description hereinafter.

It will be understood that the invention in its generic form comprehends a complete unitary process for carrying out the catalytic cracking of oils in a continuous manner involving the cracking of the oils in the presence of a powdered catalyst, the separation of the oil vapors from the catalyst, the purging of the powdered catalyst so separated of residual oil vapors, the regeneration of the catalyst so separated, the purging of the regenerated catalyst of regenerating gases and the return of regenerating catalyst to the cracking process. It will be further understood that the invention also comprises such various combinations and sub-combinations of steps in carrying out the complete and unitary process as set forth in the claims hereinafter.

With the above objects and advantages in view, the invention will be more clearly understood by reference to the accompanying drawings wherein Figs. 1 and 1-A are diagrammatic views of the apparatus for carrying out the catalytic cracking operation.

Figure 1:
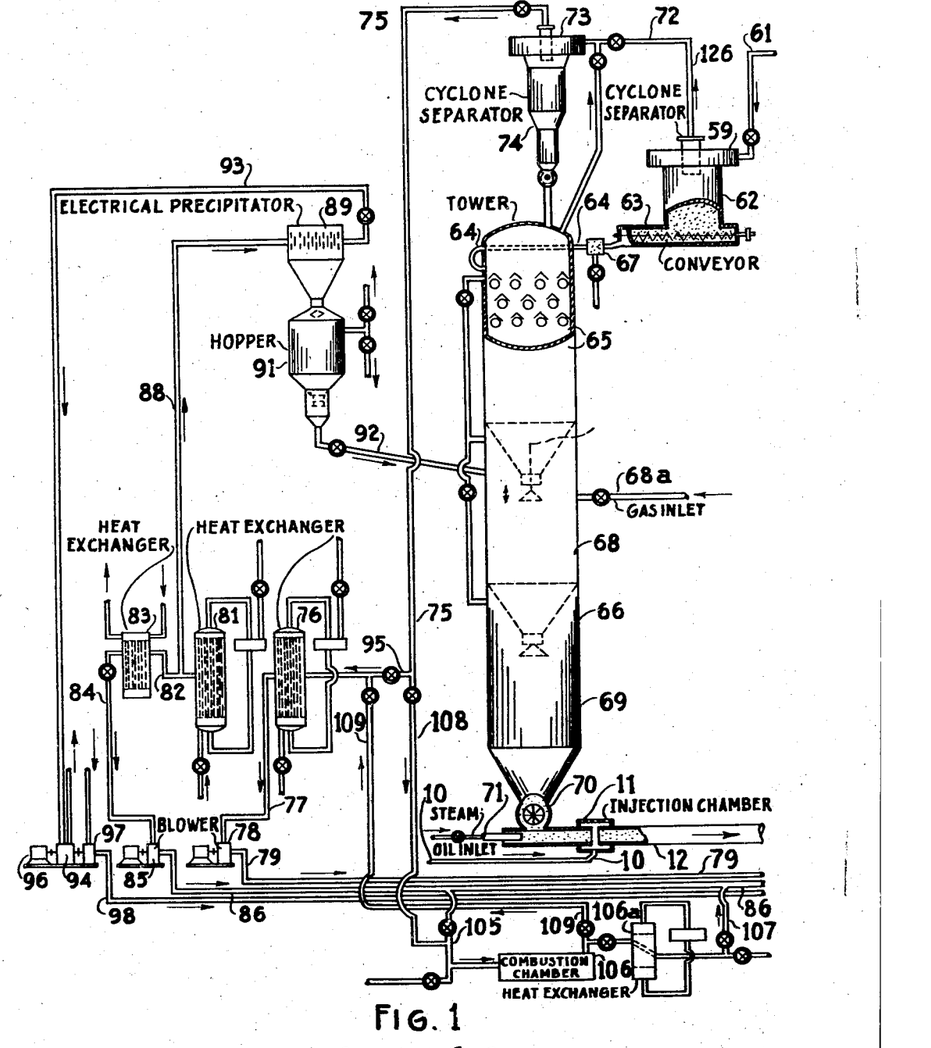

Referring to Fig. 1, the oil to be cracked, in vapor form and with or without other diluent gases such as steam, hydrogen, etc., is introduced into the apparatus through line 10. Prior to introduction, the oil is preheated to the required cracking temperature by suitable heating and vaporizing equipment which for purpose of simplicity is not shown on the drawings. In this portion of the process steam, hydrogen or other diluent may be added to aid in vaporization and/or improve the catalytic process. The oil vapors, with diluents if present, preheated to the desired reaction temperature, such as, for example, from 750° F.–1050° F., are introduced through line 10 to an annular injection chamber 11 surrounding a tubular conduit 12 through which passes a stream of powdered catalyst suspended in an inert gas such as steam, hydrogen, etc. The oil vapors introduced into the chamber 11 are injected into the suspension of catalyst and diluent gas passing through conduit 12 and are intimately admixed therewith.

The catalyst employed in the process may be any of the known materials capable of effecting the desired catalytic conversion, such as, for example, active or activated clays or synthetic absorbent gels consisting principally of silica and alumina.

The catalyst is preferably ground to a fine powder having a particle size from 200 to 400 standard mesh or even finer. The amount of catalyst as compared with the amount of oil vapors may range from 0.2 to 3 parts of catalyst per part of oil by weight, depending upon the temperature, activity of the catalyst, conversion desired and other factors.

The pressure employed in the cracking zone may be substantially atmospheric, subatmospheric, or moderate superatmospheric such as from 2 to 20 atmospheres.

Figure 1A:
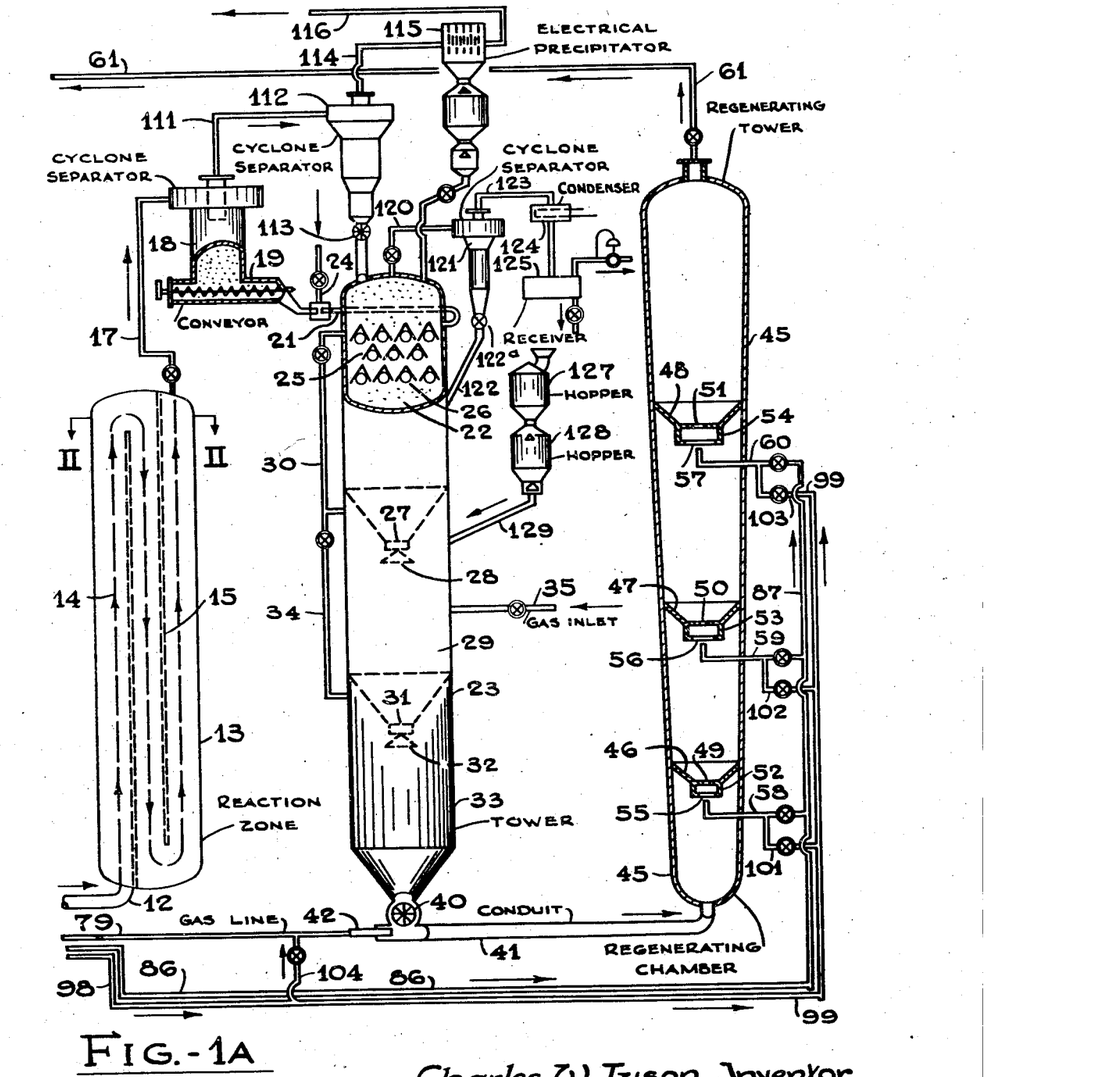
Figures 2, 3:
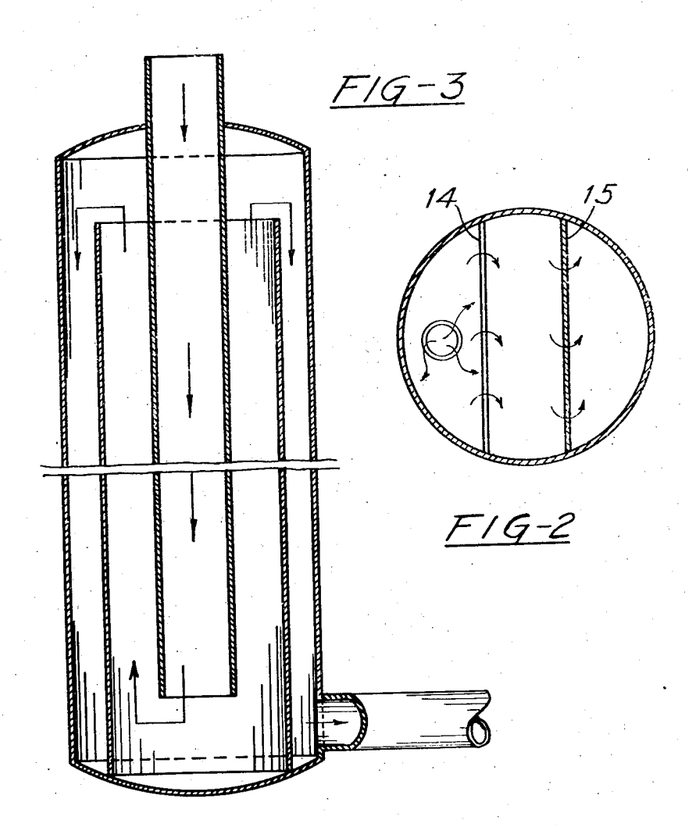
Fig. 2 is a sectional view taken on line 2—2 of Fig. 1-A showing a cross section of the reaction zone.
Fig. 3 is a sectional view of a modification of the reaction chamber shown in Fig. 2.

The oil vapors after being injected into the stream of powdered catalytic material pass through the conduit 12 to a reaction zone 13 (Fig. 1—A). Such reaction zone may be of any suitable construction capable of maintaining the catalyst in suspension in the gas and vapor stream for a period sufficient to obtain the desired degree of cracking. According to one of the specific phases of the invention, such reaction zone comprises a tubular chamber 13 provided with longitudinal segmental baffles 14 and 15 arranged to force the oil and catalyst suspension longitudinally through the reaction chamber a plurality of times before being withdrawn therefrom. Fig. 2 shows a cross section of such a chamber. As shown in Fig. 2, the reaction chamber comprises outer shell having two spaced longitudinal baffle plates 14 and 15 mounted within the shell extending transversely across the reaction chamber. Baffle plate 14 is sealed to the entrance end of the reaction chamber and terminates a short distance from the exit end of the reaction chamber. Baffle plate 15, on the other hand, is sealed to the exit end of the reaction chamber and terminates a short distance from the entrance end thereof so that the products introduced into the reaction chamber are forced to traverse substantially the full length of the reaction chamber three times before being withdrawn therefrom. Such a reaction chamber is simple and inexpensive to construct. Furthermore, the amount of heat lost by external radiation is relatively low due to the fact that the exposed surface is small compared to length through which the products travel. It will be noted that the products passing between the baffles are almost completely surrounded by products passing through the reactor. The outer shell may be lagged or lined with suitable heat insulating material or it may be placed in a furnace setting and externally heated either to compensate for radiation losses or for supplying additional heat to the reaction. While two baffles have been shown for illustrative purposes any desired number of such baffles may be provided for obtaining the desired contact time.

The baffles positioned within the reaction chamber are preferably spaced so that the cross sectional area of the three passages formed by the baffles and the wall of the reaction chamber is substantially the same so that the products passing therethrough are maintained at substantially uniform velocity.

In lieu of providing transverse baffles, as shown in Fig. 2, tubular concentric baffles may be positioned within the chamber as illustrated in Fig. 3. One end of the concentric baffles is sealed to the end of the reaction chamber and the other end terminates a short distance from the opposite end of the reaction chamber in the same manner as the transverse baffles shown in Figs. 1-A and 2. In such construction, the products containing the powdered catalyst in suspension first pass through the outside annular space between the wall of the reaction chamber and the first concentric baffle. The products then reverse and pass through the annular space between the first concentric tubular baffles and the central tubular baffle. Thereafter, the products reverse their direction and pass through the central tubular baffle and are withdrawn from the opposite end of the chamber.

The linear velocity of the gases passing through the reaction zone should be sufficient to maintain the catalyst in suspension and may be of the order of from 5 to 75 feet per second.

The time of passage of the oil vapors and the catalyst through the reaction zone is preferably controlled to effect from 30% to 80% conversion of the oil into gasoline constituents. The actual time in seconds for effecting such conversion will depend upon the relative proportions of catalyst and oil vapors passing through the reaction zone, the activity of the catalyst, the temperature to which the oil is heated, the nature of the oil to be cracked and other factors and may range in general between 1 second and 1½ minutes.

It will be understood, however, that the relative proportions of catalyst and oil vapors and the actual time of passage of the mixture through the reaction zone is to a certain extent reciprocal in that the lower the ratio, the longer the time necessary to obtain the required conversion. To obtain the best distribution of products, namely, the highest yield of desirable products, such as distillate and intermediate condensates, the relative proportions of catalyst and oil vapors charged to the reaction zone and the time of contact within the zone should be within the range described.

In certain cases it may be desirable to supply additional heat to the suspension of catalyst and oil vapors in order to carry out the desired degree of cracking. For example, when processing heavy stocks, in order to avoid excessive thermal cracking it may be desirable to avoid preheating the oil to temperatures in excess of 800° F. whereas it may be desirable to carry out the catalytic cracking at temperatures of the order of 900° F. or 1000° F.

In such cases the reaction chamber may take the form of a fired coil or a fired coil may be placed in line 12 leading to reaction chamber 13 to preheat oil vapor-catalyst mixture.

The reaction products after being maintained in the reaction zone for a period sufficient to effect the desired conversion as previously described are passed through the conduit 17 to a cyclone separator 18 in which the bulk of the powdered catalytic material is removed from the oil vapors. Cyclone separators of conventional design are normally adapted to operate on gases having as a maximum about 40 grains of dust per cubic foot of gas. Such separators are provided with a bottom section for collecting the dust particles having side walls inwardly converging from top to bottom to form a conical collecting chamber. It has been found that this type of design is not suitable for separating the bulk of the powdered material from the cracked product. Because of the relatively large volume of powdered material carried in the gases the powdered catalyst tends to clog or plug up the conical collector. It has been found that this difficulty can be overcome by providing vertical or nearly vertical side walls for the collecting chamber that is shown in the drawings.

The bulk of the powdered material separated in the cyclone separator 18 collected in the bottom, is continuously removed therefrom by means of a suitable transfer mechanism, such as a screw conveyor 19.

The screw conveyor 19 forces the catalyst so separated into a conduit 21 leading to a stripping section 22 of a tower 23. An inert gaseous stripping medium may be injected into the transfer line 21 through line 24. Such inert gas may, for example, comprise steam, low molecular weight hydrocarbon gases, nitrogen, hydrogen, etc.

The stripping chamber 22 may be provided with inverted V-shaped baffles 25 to expedite stripping of the oil vapors from the catalyst. If desired, all or additional inert stripping medium may be introduced into the catalyst in the stripping section 22 through perforated tubes 26 positioned below the baffles 25.

The bottom of the stripping section 22 of the tower 23 has an opening 27 provided with a closure valve 28 so that by opening the valve 28 the catalyst from the stripping section 22 may be discharged into an intermediate section 29 of the tower 23. A valved pressure equalizing line 30 interconnects the intermediate section 29 with the upper stripping section 22.

The bottom of the intermediate section 29 is likewise provided with an opening 31 having a closure valve 32, so that by operating valve 32 products from the intermediate section 29 may be transferred into the bottom section 33. A second valved equalizing line 34 interconnects intermediate section 29 with the bottom section 33.

The powdered catalyst collected in the upper stripping section 22 after having been stripped of residual oil vapors is periodically charged into the intermediate section 29 through the valved opening 27. During passage of the powdered catalyst from the stripping section 22 to the intermediate section 29, the valve in equalizing line 30 is opened to equalize the pressure between the two sections. After a predetermined quantity of powdered catalyst is transferred from the upper stripping section 22 to the intermediate section 29, valve 28 is closed, closing communication between the two sections. The valve in equalizing line 30 is also closed and the valve in equalizing line 34 interconnecting the bottom section with the intermediate section 29 is opened to equalize the pressure between these two sections. The valve 32 in the bottom of the intermediate section 29 may then be opened permitting the products to drop from the intermediate section into the lower section 33 of the tower 23.

The lower section 33 forms a feed hopper for charging the catalyst to the regenerating unit. By providing an intermediate section 29 between the stripping section 22 and the feed hopper 33 for the regenerating circuit, a differential pressure may be maintained between the stripping section and the regenerating circuit.

If desired, additional inert gas may be introduced into the intermediate section 29 through line 35 to build up the desired pressure on the catalyst for carrying out the regeneration.

The bottom of the lower section 33 is provided with suitable feeding mechanism, such as, for example, a rotary star feeder 40 for continuously removing the catalyst from tower 23 and injecting it into a stream of regenerating gases. To this end the star feeder 40 discharges the catalyst into a conduit 41 where it meets a hot carrier gas introduced through jet 42 and is transferred by means of said carrier gas into the bottom of the regenerating chamber 45. The carrier gas is preferably spent products of regeneration and may contain sufficient free oxygen to initiate the combustion of the carbonaceous deposits contained on the catalyst. This carrier gas is preferably under substantial pressure such as from 2 to 20 atmospheres. The catalyst to be regenerated suspended in the carrier gas is carried into the bottom of vertical regenerating tower 45, the side wall of which flares outwardly to form an inverted cone-shaped regenerating chamber of progressively increasing diameter. The tower 45 is preferably provided with a heat insulating lining (not shown). Positioned within the tower is a plurality of elements for mixing the dispersed powdered material and added regenerating and cooling gases. These mixing elements may comprise, for example, spaced baffles 46, 47 and 48. Each of said baffles is preferably saucer-shaped with an outer conical rim portion and a central flat section. The flat section of the baffles 46, 47 and 48 is provided with slotted openings 49, 50 and 51, respectively. Depending from the flat section of the baffles 46, 47 and 48 and surrounding the slotted openings therein are depending annular sleeves 52, 53, and 54, respectively. The ends of the sleeves 52, 53 and 54 are likewise provided with slotted openings 55, 56 and 57, extending at right angles to the slotted openings 49, 50 and 51 in the baffles 46, 47 and 48, respectively.

It will be apparent from the above description that before the products can pass from one side of the baffle to the other, they must first pass through slotted openings into a confined annular space formed by the depending sleeve and then must pass through a second slotted opening extending at right angles to the first slot. This construction therefore insures intimate mixing of the powdered catalyst particles in the regenerating gas during passage from one side of the baffle plate to the other.

Extending through the wall of the regenerating chamber at spaced points longitudinally thereof is a plurality of pipes 58, 59 and 60 for introducing additional supplies of regenerating and cooling gas. The pipes 58, 59 and 60 project a substantial distance within the regenerating chamber and preferably terminate adjacent to the slots 55, 56 and 57. The gas introduced through lines 58, 59 and 60 into the regenerating chamber 45 may be an inert gas such as spent combustion gases from the regenerating circuit, as hereinafter described, or it may contain additional amounts of free oxygen for burning the carbonaceous deposits from the catalyst particles. The gases are preferably introduced through pipes 58, 59 and 60 at a temperature materially below the temperature within the regenerating chamber to thereby cool the gases in the regenerating chamber and prevent the temperature from exceeding the desired maximum.

The regenerating equipment as just described permits careful regulation of the regenerating temperature. The catalyst suspension introduced into the bottom of the regenerating chamber may, for example, be at an ignition temperature, such as, for example, 850° F. When the temperature due to the combustion of the carbonaceous deposits has reached a temperature of 1000°, for example, an additional cooling gas with or without oxygen may be introduced through the conduit 58 to reduce the temperature to 850° F. As the combustion of the carbonaceous deposits continues and the temperature again reaches 1000° F., additional cooling gas with or without additional oxygen is introduced through the conduit 59 and the temperature of the product is again reduced to the minimum ignition temperature, such as 850° F. As the combustion further continues and the temperature again reaches 1000° F., additional cooling gas is further introduced through line 60 to again reduce the temperature to the lowest desired ignition temperature. Any suitable number of conduits for introduction of the cool gas may be provided at spaced points within the regeneration chamber to effect the desired control of the temperature.

The time necessary to retain the catalyst within the regenerating chamber 45 in order to complete the regeneration will depend upon the amount of coke or carbonaceous deposits contained on the catalyst and other factors. Under normal conditions of operation substantially complete regeneration can be obtained in a period ranging from 5 to 75 seconds.

By constructing the regenerating chamber in the form of an inverted cone, the velocity of the gases passing through the regenerating chamber will be highest on the inlet side of the several combustion zones formed by the baffle plates 46, 47 and 48 so that any catalyst which normally tends to settle out in the upper zones of these sections will be again suspended in the regenerating gases by reason of the higher velocity in the bottom portion of the section. The conical shape of the regenerating chamber also tends to keep more nearly uniform the velocities in the various sections inasmuch as the largest cross section is provided where the largest portion of regeneration gases has been added.

After passing through the regenerating chamber 45 the regenerated catalyst and gases will pass through line 61 to a cyclone separator 62 of a construction similar to separator 18 previously described. The bulk of the regenerated catalyst is removed from the regenerating gases during passage through the separator 62 and collected in the bottom thereof. The bottom of the cyclone separator is provided with a suitable conveyor mechanism, such as a screw conveyor 63, for removing the catalyst so separated. The powdered catalyst so removed is passed through a transfer line 64 to the upper section 65 of a vertical tower 66 constructed the same as the vertical tower 23 heretofore described. Inert stripping gas, such as steam or combustion gases for stripping the regenerated catalyst of regenerating gases, may be introduced into the transfer line 64 through line 67.

The upper stripping section of the chamber 66 may also be provided with suitable inverted V-shaped baffles to facilitate removal of the regenerating gas from the catalyst. Also additional stripping medium may be introduced into the upper section 65 through perforated tubes disposed below the inverted V-shaped baffles.

The catalyst collected in the upper section 65 of the chamber 66 is periodically transferred to the intermediate section 68 wherein it is placed under desired pressure and thence transferred to the bottom section 69 which serves as a feeding hopper for feeding the regenerated catalyst to the cracking circuit. The intermediate section 68 may also be provided with a pressure line 68A for introduction of a gas such as steam, hydrogen or the like for building up any desired pressure therein. The bottom of the lower compartment 69 is provided with suitable mechanism, such as a rotary star feeder 70, for removing the catalyst from the bottom of the compartment and introducing it into the initial conduit 12 in which it meets the fresh vapors to be cracked. The catalyst from the feeder 70 is picked up by an inert gaseous medium such as steam, introduced through injector nozzle 71.

By first suspending the catalyst in an inert gas, before commingling the oil vapors to be cracked therewith, an inert gaseous shield is provided between the conveyor mechanism 12 and the point of introduction of the oil vapors, which prevents the oil vapors from passing back into the conveyor mechanism and plugging the conveyor with carbonaceous deposits. The regenerating gas free from the bulk of the regenerated catalyst in the cyclone separator 62 but still containing substantial quantities of powdered catalyst is removed therefrom through line 72 and passed to a second cyclone separator of conventional design wherein further powdered catalyst is removed from the gaseous stream. The powdered catalyst so removed drops to the bottom section 74 of the cyclone separator and is transferred by means of suitable mechanism directly into the upper stripping section of the vertical chamber 66.

The regenerating gases after passing through the second cyclone separator 73 in which most of the remaining powdered catalyst is removed continues through line 75 to an initial heat exchanger 76 which may comprise a waste heat boiler or any other suitable heat exchange mechanism. The products passed through the waste heat boiler are preferably cooled from a regenerating temperature down to a temperature of the order of from 700° F. to 900° F. After passing through the waste heat boiler, a part of these gases may be passed through line 77 to a blower 78 and thence forced through line 79 to the injector nozzle 42 and used as a carrier for the unregenerated catalyst removed from the bottom of the chamber 23.

The remainder of the gases after passing through the initial heat exchanger 76 may continue through a second heat exchanger 81 and be cooled to a temperature of the order of 400° F. to 600° F. A part of the gas stream, after passing through the second heat exchanger, may be passed through a third heat exchanger 83 and further cooled to a temperature such as, for example, 200° F. to 300° F. The gases so cooled may be then recycled through line 84, blower 85, line 86, manifold 87 and branch lines 58, 59 and 60 back to the regenerating chamber as a cooling agent therefor.

The remainder of the regenerating gases after passing through the second heat exchanger 81 may be passed through line 88 to an electrical precipitator 89 of conventional design for removing the last traces of the powdered catalyst from the regenerating gases. The catalyst so separated in the electrical precipitator may be charged into a hopper 91 from whence it may pass through line 92 to the intermediate compartment 68 of the chamber 66 and there combined with regenerated catalyst separated in the cyclone separators.

The regenerating gases from the electrical precipitator 89 are then passed through line 93 and expanded in a turbine 94 to atmospheric pressure. The energy liberated in the turbine 94 may be employed for compressing the air employed for accomplishing the regeneration. To this end, the turbine 94 is shown interconnected with a motor-generator 96 and the air blower 97 so that any power deficiency or surplus over that necessary to compress the air for introduction into the regenerating chamber may be supplied or removed by the motor-generator 96. The air from the air compressor 97 may be passed through line 98 to a manifold line 99 (see Fig. 1—A) having branch lines 101, 102 and 103 merging with lines 58, 59 and 60 entering the regenerating chamber 45 so that the air may be introduced at spaced points within the regenerating chamber as previously described. If desired, a part or all of the air for effecting regeneration may be passed from line 98 through a branch line 104 and commingled with the highly heated regenerating gases recycled through line 79 and employed as a carrier for transferring the unregenerated catalyst to the regenerating chamber.

A part or all of the regenerating gases after passing through the third heat exchanger 83 rather than being recycled directly to the regenerating chamber 45 may be passed through line 105 to a combustion chamber 106 and the carbon monoxide and other combustible gas burned therein in admixture with other combustion gases. The products from the combustion chamber 106 may be passed through a suitable heat exchanger 106—A before recovery of heat therefrom and thereafter vented from the system or recycled to the regenerating chamber through line 107 if desired.

As a further alternative, all of the regenerating gases after passing through the two cyclone separators 62 and 74 may be passed directly through line 75 and line 108 to the combustion chamber 106 for removing combustion products therefrom prior to passing to the heat exchangers 76 and 81. In such case, the combustion products from the combustion chamber 106 may be passed through line 109 to the heat exchangers 76, 81 and 83, respectively.

The inert gas produced in chamber 106 after leaving cooler 106—A may be used for stripping in stripping sections 22 and 65, and/or as a stripping medium in pipes 24 and 67, and/or pressure control medium in pipes 35 and 68—A.

Returning now to the cracking process, the oil vapors after passing through the initial cyclone separator 18 in which the bulk of the catalyst is separated therefrom pass through line 111 to a second cyclone separator 112 of conventional design for effecting further separation of powdered material from the oil vapors. The powdered catalyst in the second cyclone separator is transferred by means of a star feeder 113 to the stripping section 22 of the chamber 23. Vapors from the second cyclone separator 112 pass through line 114 to an electrical precipitator 115 for further removal of the catalyst particles from the oil vapors.

One of the important features of the present invention is the substantially complete removal of the powdered catalytic material in dry state before condensation of the oil vapors. By so doing, the catalyst is separated in a state in which it can be readily purged of residual oil products, regenerated and directly re-used.

The overhead products from the electrical precipitator pass through line 116 to a suitable fractionating tower (not shown) for the fractionation and separation of the desired motor fuel products from the remainder of the cracked products. The fractionating equipment may be of conventional design and need not here be described. Any powdered catalyst material not separated by the electrical precipitator 115 will collect in the bottom of the fractionating tower. The bottom of the fractionating tower may comprise the total cycle stock of the process or a heavy-boiling cycle stock fraction may be segregated during the fractionation by means of a trap-out tray located in the fractionating tower or by the use of two or more fractionating towers so that the dust particles passing to the fractionating tower will be collected in the heaviest boiling gas oil fraction.

Returning again to the vertical tower 23 in which the unregenerated catalyst is first stripped of oil vapors and then transferred from the cracking cycle to the regenerating chamber, the gases separated in the stripping section 22 pass overhead through line 120 to a cyclone separator 121 or similar device for separation of any catalyst particles therefrom. The powdered catalyst so separated is again returned to the upper compartment 22 through line 122 provided with star feeder 122—A. The gases from the cyclone separator consisting of residual oil vapors contained in the unregenerated catalyst and relatively large amounts of inert gas introduced for stripping purposes through line 24 pass through line 123 to a condenser 124 and thence to a receiver 125. While such gases may be passed to the fractionator in which the vapors from the cracking cycle are fractionated, it is desirable to subject this to separate condensation. The liquid collected in receiver 125 may be subjected to further distillation and fractionating treatment to separate the same into the desired products.

Stripping gas from the stripping section 65 of the tower 66 receiving the regenerating catalyst may be returned to the main regenerating gas line 72 through line 126.

Fresh catalyst for starting up the operation and for making up for that lost during the cracking process may be supplied at any desired point in the cracking circuit. When supplying fresh catalyst to make up for that lost during the cracking operation, however, it is preferred to add the fresh catalyst to the unregenerated catalyst and pass the mixture through the regenerating chamber so that the fresh catalyst and regenerated catalyst can be brought to equilibrium temperature and moisture conditions prior to introduction into the primary cracking circuit. To this end a fresh catalyst hopper 127 is provided adjacent to the vertical spent catalyst tower 23. Fresh catalyst from the hopper 127 is periodically discharged through a valved opening in the bottom thereof into a double bell hopper 128 adapted to maintain a pressure seal between the catalyst hopper and the spent catalyst tower 23. The fresh catalyst is charged from the double bell hopper 128 through line 129 into the intermediate repressuring section 29 of the tower 23.

The following example of the method of operating the process may be helpful to a better understanding of the invention, it being understood that the values given herein are illustrative rather than limitative. In the example, the amount of oil and catalyst and the size of the equipment specified are for processing 20,000 barrels of oil per stream day with an equilibrium conversion of about 40% per pass.

An East Texas virgin gas oil having an A. P. I. gravity of about 33 is initially vaporized and heated to a reaction temperature of about 900° F. at a rate sufficient to avoid any substantial amount of thermal cracking in the preheating equipment. The preheated gas oil vapors pass through charge line 10 and injection sleeve 11 into conduit 12 at a rate of about 7400 cubic feet per minute. Fresh catalyst is charged through star conveyor 70 of the regenerated catalyst tower 66 at a rate of about 226 cubic feet per minute or about 7930 lbs. per minute. This catalyst is a synthetic silica-alumina oxide gel catalyst formed by impregnating a silica hydrogel with an aluminum nitrate and thereafter drying the hydrogel and decomposing the nitrate to form a mixed silica-alumina oxide having a mol ratio of silica to alumina of about 12 to 1. The fresh catalyst introduced through star conveyor 70 into the conduit 12 is first suspended in a stream of steam introduced through jet 71 at a rate of about 5,000 lbs. per hour. The initial pressure on the mixture of steam, catalyst and oil vapors is preferably only sufficient to overcome friction losses in the unit although it may, for example, be of the order of 45 lbs. per square inch. The mixture of catalyst, steam and oil vapors passes through transfer line 12 to a reaction chamber 13 substantially 10 feet in diameter and 60 feet in length and containing two baffles as shown in the drawings. The time of passage of the oil-catalyst suspension through the transfer line and reaction chamber is preferably of the order of 45 seconds. The product after passing through the reaction chamber passes through line 17 to a cyclone separator 18 wherein the bulk of the powdered catalyst is removed from the vapor stream. Vapor removed from the cyclone separator 18 and containing about 40 grains of catalyst per cubic foot of gas, passes to the second cyclone separator 112 wherein further dust particles are removed leaving about 2 grains per cubic foot of catalyst in the vapors leaving the second separator. Vapors leaving the second separator pass to the electrical precipitator 115 wherein additional catalyst is removed therefrom so that the vapors leaving the precipitator are substantially free of powder material containing not more than .3 lb. per cubic ft. These vapors then pass to a conventional fractionating equipment wherein the desired distillate product consisting of products boiling within the gasoline boiling range is taken off overhead.

The catalyst separated in the cyclone separators and electrical precipitator passes through a stripping section 22 of the vertical spent tower 23 and is there stripped of residual oil vapors. To effect the stripping operation an inert gas is introduced through line 24 at a rate of about 2260 cubic feet per minute. The spent catalyst tower 23 under the above conditions may be about 10 feet in diameter and 71 feet in height of which 22 feet may be in the stripping section, 22 feet in the repressure intermediate section 29, and 27 feet in bottom feed hopper 33. This tower is preferably at a temperature of about 850° F. An inert gas at the rate of about 115 cubic feet per minute may be introduced into the intermediate pressure section 29. The unregenerated catalyst is removed from the bottom of the tower 29 through a star conveyor 40 at a rate of about 226 cubic feet per minute, or, in other words, at the same rate that the catalyst is fed to the oil vapors through star conveyor 70. The unregenerated catalyst from star conveyor 40 is suspended in recycled regenerating gas. The gas is at a temperature of about 850° F. and under a pressure of about 45 lbs. per square inch. The recycled regenerating gas is introduced into conduit 41 at a rate of about 7930 cubic feet per minute.

The suspension of catalyst and regenerating gas then passes into the regenerating chamber 45 which is approximately 5′ 10″ in diameter at the bottom, 10' in diameter at the top and about 80' in length. A cooling gas, at a temperature of about 250° F., is introduced at spaced points along the reaction chamber through lines 58, 59 and 60 at a rate regulated to control the temperature within the reaction chamber below a predetermined temperature which is preferably 1000° F. The amount of cooling gases so introduced may be of the order of 41,850 cubic feet per minute of which 8650 cubic feet may be introduced through line 58, 11,000 cubic feet through line 59, and 22,200 cubic feet through line 60. The time of passage of the suspension of regenerating gas and catalyst through the regenerating chamber will be controlled to substantially completely remove the carbonaceous deposits contained on the catalyst. Also the amount of air introduced into the regenerating circuit will be regulated to control the temperature during regeneration. In case the amount of coke on the catalyst represents between 1% and 3%, of the oil feed to the process, the amount of air introduced into the regenerating chamber may be of the order of from 8,000 to 35,000 cubic feet per minute at 100° F. The time of passage of the suspension through the regenerating chamber may be of the order of from 10 to 60 seconds.

The suspension of regenerated catalyst and gas after passing through the regenerating chamber passes through line 61 to the cyclone separator 62 wherein the bulk of the catalyst is removed from the gas stream. Under the above conditions the relative volume of gases passing to the electrical precipitator will be of the order of from 70,000 to 80,000 cubic feet per minute and the temperature will be of the order of from 900° F. to 1000° F.

The regenerating gases separated in the first cyclone separator 62 and containing about 40 grains of catalyst per cubic foot of gas pass to the second separator 73 wherein additional catalyst particles are separated leaving about 2 grains per cubic foot of catalyst in the gases removed from the second cyclone separator. The regenerated catalyst separated in the cyclone separators 62 and 73 is charged into the stripping section 65 of the generated catalyst tower 66 in which it is stripped of regenerated gases by the introduction of an inert gas such as nitrogen or steam introduced into the line 67 at a rate of about 2260 cubic feet per minute.

The regenerated catalyst tower 66 may be of the same dimensions as to tower 23. The stripped regenerated catalyst is periodically charged to the intermediate section 68 where it is placed under the same pressure as the bottom feeding section 69 and then discharged into the bottom feeding section where it is returned to the cracking circuit.

The regenerating gases pass through the first wasteheat boiler 76, designed to produce steam under 250 lbs. pressure. In the first waste heat boiler the temperature of the gas is reduced from about 925° F. to 950° F. down to 800° F. to 850° F. A portion of the cooled gas amounting to about 7930 cubic feet per minute is returned by blower 78 as carrier gas for the unregenerated catalyst. The remainder passes through a second waste heat boiler, designed to produce steam under about 125 lbs. pressure, and cooled to a temperature of about 500° F. A portion of the remainder amounting to about 25,700 cubic feet per minute is passed through a water cooler and reduced to a temperature of from 200° F. to 300° F. and then recycled as a cooling agent for the regenerating chamber as previously described. The remainder passes to the electrical precipitator and then to the turbine.

While the apparatus has been described with particular reference to the catalytic cracking of hydrocarbon oils to which it is particularly adaptable, it will be understood that in its broader aspect it will have a more general application such as for carrying out other types of high temperature hydrocarbon reactions such as reforming, desulfurization, alkylation, polymerization, etc. The apparatus also has particular application to the coking of residual oil stock in the presence of a relatively inert adsorbent powder such as pumice or spent clay. In such cases the adsorbent material will have little if any catalytic activity but will serve as an adsorbent for the coke formed during the vis-breaking or coking operation, which coke may later be burned off from the inert material in a regenerating circuit such as shown in the drawings.

This application forms a division of application Serial No. 286,498, filed July 26, 1939.

Having thus described the specific embodiment of the invention it will be understood that other modifications and variations have come within the spirit and scope thereof. It will also be understood that it is not the intention to unnecessarily restrict the invention or dedicate any novel features thereof.

I claim:

1. In a process for the catalytic conversion of hydrocarbon oils wherein a catalyst in subdivided form is continuously circulated in admixture with oil vapors through a conversion zone and in admixture with oxidizing gas through a regeneration zone, the method of maintaining a seal between said conversion and regeneration zones which comprises accumulating a body of catalyst from one of said zones in a storage zone, periodically transferring catalyst so accumulated into a sealing zone separate and independent from said storage zone, increasing the pressure on the catalyst within said sealing zone, periodically transferring catalyst from said sealing zone to a feeding zone separate and independent from said storage and sealing zones, continuously discharging catalyst from said feeding zone into a stream of gaseous material passing through the other of said first-named zones, and maintaining a mechanical seal between said storage and feeding zones throughout the operation of said process.

2. In a process for the catalytic conversion of hydrocarbon oils wherein a catalyst in subdivided form is continuously circulated in admixture with oil vapors through a conversion zone and thereafter in admixture with an oxidizing gas through a regenerating zone, the method of maintaining a seal between said conversion zone and said regenerating zone which comprises accumulating a body of catalyst removed from said conversion zone in a storage zone, periodically transferring catalyst so accumulated into a sealing zone separate and independent from said storage zone, increasing the pressure on said sealing zone, periodically transferring catalyst from said sealing zone to a feeding zone, continuously discharging catalyst from said feeding zone into a stream of oxidizing gas passing through said regenerating zone, and maintaining a mechanical seal between said storage zone and said feeding zone throughout the operation of said process.

3. In a process for the catalytic conversion of hydrocarbon oils wherein a catalyst in subdivided form is continuously circulated in a closed circuit in admixture with oil vapors through a conversion zone and thereafter in admixture with an oxidizing gas through a regenerating zone, the method of maintaining a seal between said regenerating zone and said conversion zone which comprises accumulating a body of catalyst removed from said regenerating zone in a storage zone, periodically transferring the catalyst from said storage zone to a sealing zone separate and independent from said storage zone, increasing the pressure on said catalyst within said sealing zone, periodically transferring catalyst from said sealing zone to a feeding zone separate and independent from said storage and sealing zones, continuously discharging catalyst from said feeding zone into the oil vapors to be converted, and maintaining a mechanical seal between said storage zone and said feeding zone throughout the operation of said process.

4. In a process for the catalytic conversion of hydrocarbon oils wherein a catalyst in subdivided form is continuously circulated in a closed circuit through a conversion zone in admixture with oil vapors and thereafter through a regenerating zone in admixture with an oxidizing gas to remove carbonaceous deposits formed thereon, the improvement which comprises accumulating a body of catalyst removed from said conversion zone in a storage zone, periodically transferring catalyst so accumulated from said storage zone into a sealing zone separate and independent from said storage zone, periodically transferring catalyst from said sealing zone into a feeding zone separate and independent from said sealing and storage zones, continuously discharging catalyst from said feeding zone into a stream of oxidizing gas, passing the resulting mixture through a regenerating zone, thereafter separating regenerated catalyst from said oxidizing gas, accumulating a body of regenerated catalyst removed from said regenerating zone in a second storage zone, periodically transferring regenerated catalyst so accumulated into a second sealing zone separate and independent from said storage zone, periodically transferring catalyst from said second sealing zone into a second feeding zone, continuously discharging catalyst from said second feeding zone into a stream of oil vapors to be converted, passing the resulting mixture through said conversion zone, increasing the pressure on the catalyst in at least one of said sealing zones, and maintaining a mechanical seal between said feeding zones and said storage zones to prevent the transfer of gaseous materials from said regenerating zone to said conversion zone.

5. An apparatus for the catalytic conversion of hydrocarbon oils which comprises a conversion chamber, means for passing a mixture of hydrocarbon oil vapors and finely divided catalyst through said conversion chamber, means for separating finely divided catalyst from the vaporous conversion products, a storage hopper, means for transferring catalyst separated from said vaporous conversion products into said hopper, a closed sealing hopper, a valved connection between said storage hopper and said sealing hopper, means for increasing the pressure on catalyst within said sealing hopper, a closed feeding hopper, a valved connection between said sealing hopper and said feeding hopper, a regenerating chamber, means for passing a regenerating gas through said regenerating chamber, means for continuously feeding catalyst from said feeding hopper into said regenerating gas, means for separating regenerated catalyst from said regenerating gas and means for returning said catalyst so separated to said conversion zone.

6. An apparatus for catalytic conversion of hydrocarbon oils which comprises a regeneration chamber, means for passing a mixture of oxidizing gas and finely divided solid catalyst containing combustible deposits through said regenerating chamber to burn the combustible deposits therefrom, means for separating regenerated catalyst from said regenerating gas, a storage hopper in communication with said separating means, a closed sealing hopper, a valved connection between said storage hopper and said sealing hopper, means for increasing the pressure on catalyst within said sealing hopper, a closed feeding hopper, a valved connection between said sealing hopper and said feeding hopper, a conversion zone, means for passing oil vapors to be converted through said conversion zone, means for continuously transferring catalyst from said feeding hopper into said oil vapors to be converted, means for separating finely divided catalyst containing combustible deposits from the vaporous conversion products, and means for introducing catalyst so separated into said stream of oxidizing gas passing through the conversion zone.

7. An apparatus for the catalytic conversion of hydrocarbon oils which comprises a conversion chamber, means for passing a mixture of oil vapors to be converted and subdivided catalyst through said conversion chamber, means for separating catalyst containing combustible deposits from the vaporous conversion products, a storage hopper in communication with said separating means and adapted to receive the catalyst separated from said vapors, a sealing hopper, a valved connection between said storage hopper and said sealing hopper, a closed feeding hopper, a valved connection between said sealing hopper and said feeding hopper, a regenerating chamber, means for passing an oxidizing gas through said regenerating chamber, means for continuously feeding catalyst from said feeding hopper into said oxidizing gas, means for separating regenerated catalyst from the regenerating gas, a second storage hopper in communication with said separating means, a second sealing hopper, a valved connection between said second storage hopper and said second sealing hopper, a second feeding hopper, a valved connection between said second sealing hopper and said second feeding hopper, means for continuously introducing catalyst from said second feeding hopper into said oil vapors passing through said conversion zone, and means for increasing the pressure on catalyst in at least one of said sealing hoppers.

CHARLES W. TYSON.